United States Patent
Rousey

[15] 3,645,192
[45] Feb. 29, 1972

[54] WIND BRACED TURBINE

[72] Inventor: Donald L. Rousey, Des Plaines, Ill.
[73] Assignee: Questor Corporation, Toledo, Ohio
[22] Filed: June 1, 1970
[21] Appl. No.: 41,975

[52] U.S. Cl. ............................................. 98/75, 98/72
[51] Int. Cl. ........................................................ F23l 17/02
[58] Field of Search ............................................ 98/72, 75

[56] References Cited

UNITED STATES PATENTS

| 535,276 | 3/1895 | Doerge | 98/75 |
| 944,043 | 12/1909 | Marcus | 98/75 |
| 3,392,659 | 7/1968 | Rousey | 98/75 |

Primary Examiner—Edward J. Michael
Attorney—Olson, Trexler, Wolters & Bushnell

[57] ABSTRACT

A wind braced turbine ventilator having a turbine head supported by an upwardly extending central shaft which sharply tapers to a point at each end thereof. The shaft is rotatably mounted to a stationary support structure through a pair of self-aligning bearing assemblies. The bearing assemblies comprise substantially spherical bearings having cavities therein for receiving the pointed ends of the central shaft so as to allow the latter to rotate freely therein. In addition, the bearings are mounted to the stationary support structure for movement relative thereto, which movement allows the bearings to remain in cOntinuous alignment with each other for minimizing frictional drag.

8 Claims, 4 Drawing Figures

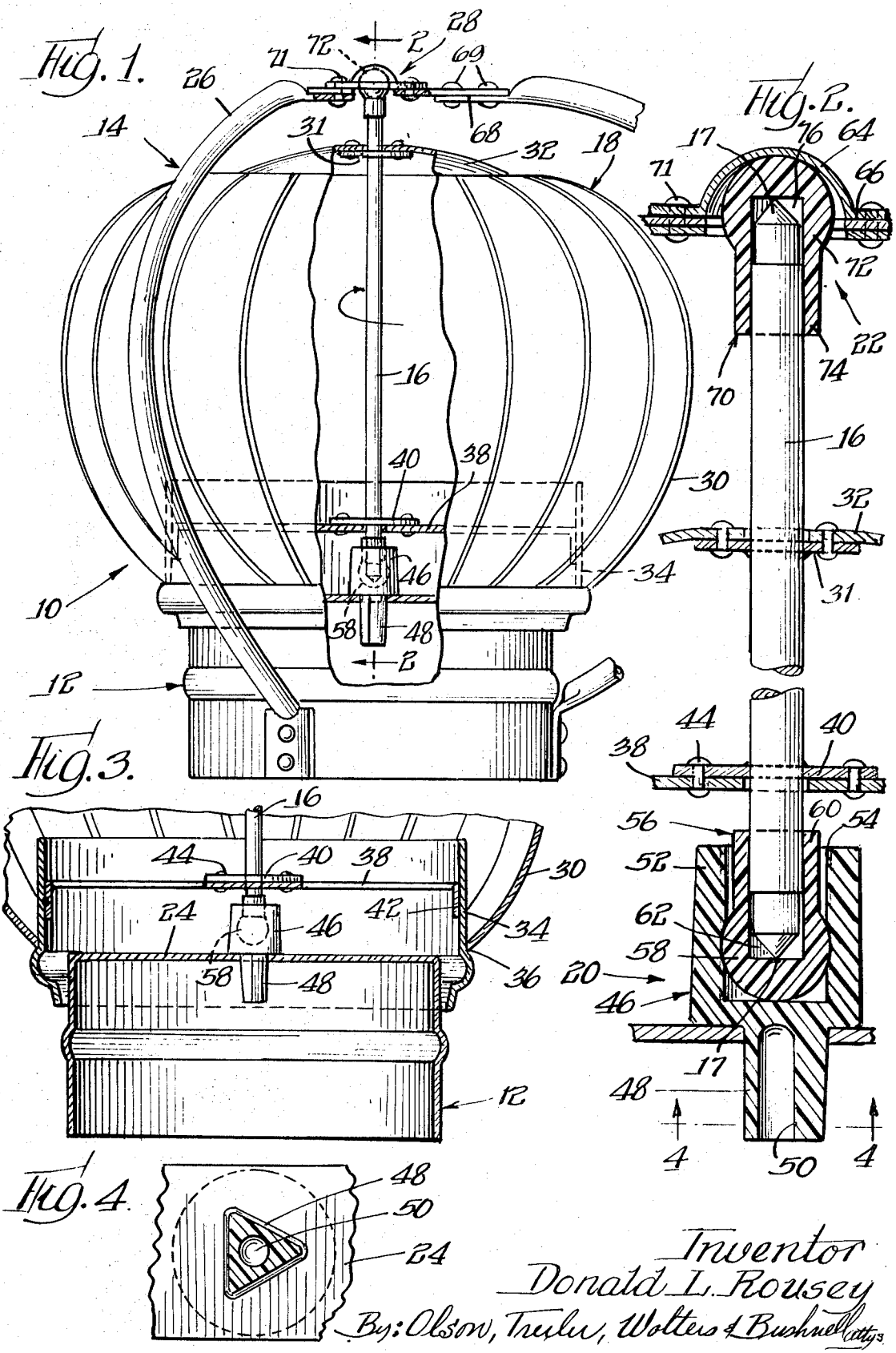

WIND BRACED TURBINE

SUMMARY OF THE INVENTION

The present invention relates to a novel ventilator structure, and more specifically to a novel rotary turbine ventilator having self-aligning features.

BACKGROUND OF THE INVENTION AND OBJECTS

Rotary or turbine ventilators of the general type to which the present invention is directed are normally employed on ventilators and generally include a turbine head connected to a shaft which is mounted for rotation to a stationary support structure. Rotational movement of the shaft is provided by a pair of bearing assemblies connecting the shaft and support structure.

While the prior art discloses various types of bearing assemblies, it has been found that none of these adequately prevents binding between the assemblies and the rotating shaft, this being due to either initial assemblage of the ventilator or continued outdoor use without maintenance thereof. This binding action, in turn, increases the frictional resistivity or drag between the shaft and bearing assemblies so as to cause a reduction in the rotary action of the turbine head and general inefficiency of the ventilator.

Accordingly, it is an object of the present invention to provide a turbine ventilator constructed to attain and assure freedom of rotative movement after assemblage and considerable use thereof.

Another important object of the present invention is to provide a turbine ventilator employing a pair of novel bearing assemblies which minimize frictional drag between the moving components thereof.

A more specific object of the present invention is to provide a turbine ventilator employing a pair of bearing assemblies which are constructed so as to remain in continuous alignment with each other for achieving the aforesaid minimization of frictional drag.

Yet another specific object of the present invention is to provide a turbine ventilator of the above-described type employing a central rotating shaft having pointed ends engaging a pair of bearing assemblies for minimizing the frictional drag at the points of engagement.

Still another object of the present invention is to provide a turbine ventilator construction that is adapted to withstand adverse environmental conditions such as winds of high velocity without the danger of failure due to disalignment of its bearing assemblies.

Other objects, features and advantages of the present invention will become apparent to those skilled in the art as the detailed description of the illustrated embodiment is evolved hereinafter.

DESCRIPTION OF THE DRAWINGS

FIG. 1 is a partial elevational view of a turbine ventilator of the type to which the present invention is directed, with a portion of the turbine assembly and the base member broken away;

FIG. 2 is an enlarged fragmentary, partially sectional view taken generally along the line 2—2 in FIG. 1;

FIG. 3 is a partial sectional view of the turbine ventilator of FIG. 1, specifically displaying the lower portion thereof; and FIG. 4 is a sectional view taken along the line 4—4 in FIG. 2.

DETAILED DESCRIPTION

Referring now more specifically to the drawings wherein like parts are designated by the same numerals throughout the various figures, a turbine unit, designated generally by reference numeral 10, incorporating the features of the present invention is shown in FIG. 1. The unit 10 includes a base member 12, an external brace or frame assembly 14, an upwardly extending central shaft 16 mounted for rotation about its longitudinal axis and having its ends sharply taper to points 17, and a vaned turbine head 18 connected to the central shaft for rotary movement relative to the base 12 and brace assembly 14. As will be described in more detail hereinafter, the rotation of shaft 16 is provided by a lower bearing assembly 20 which connects the lower end of the shaft to base member 12 and an upper bearing assembly 22 which connects the upper end of the shaft to external brace or frame assembly 14.

The base member 12, which is adapted to be connected to a ventilator, includes at its top thereof a diametrically extending brace, generally designated by the reference numeral 24, which arrangement allows the ventilating material to pass therethrough. This brace supports lower bearing assembly 20 at its center thereof, in a manner to be described hereinafter.

The external brace or frame assembly 14 is affixed to base 12 and extends upwardly thereof in surrounding relation to the turbine head 18. The frame assembly includes a plurality of strut members 26 which are affixed to and circumferentially spaced around base member 12 at the lower ends thereof, and affixed to a bearing cap arrangement 28 which is superposed with respect to the turbine head and which comprises part of upper bearing assembly 22, as will be described hereinafter.

Concerning now the turbine head 18, attention is directed specifically to FIGS. 1 and 3. The turbine head includes a plurality of circumferentially spaced vane or turbine blade members 30 which are attached at their upper ends to a dome-shaped cap member 32, and at their lower ends to a cylindrical member 34 which in turn is connected to central shaft 16, in a manner to be described hereinafter. The manner of connecting the vane members to cap member 32 is a matter of choice and not critical to the present invention, riveting, welding, or the like, being anticipated. In like manner, the dome-shaped cap member is connected to the upper end of shaft 16 as generally indicated by the reference numeral 31.

Directing attention now solely to FIG. 3, a lower margin 36 of each of the turbine blade members 30 rests on an annular head formed on cylindrical member 34, which cylindrical member encircles the base member 12 in spaced relationship thereto. If desired, the margins may be welded or otherwise secured to the cylindrical member. A spider arrangement, comprising a plurality of horizontally extending legs 38 circumferentially spaced around the lower end of shaft 16 and a central disc 40, extends between cylindrical member 34 and the shaft 16. Outer ends of the legs 38 include downwardly extending flanges 42 which are welded or otherwise suitably fastened to cylindrical member 34, the other ends of the legs being secured to disc 40 by rivets or other fastening devices 44. The central disc, which circumscribes central shaft 16, is welded or otherwise suitably secured thereto for transmitting the rotational movement of the shaft to the cylindrical member which in turn causes turbine head 18 to rotate simultaneously therewith.

Turning to FIG. 2, the lower and upper bearing assemblies 20 and 22, respectively, are shown in detailed cross section. In accordance with the invention, the lower bearing assembly comprises a bridge holder or socket 46 made of a tough resilient rubber or rubberlike material. The socket includes a downwardly extending triangular neck portion 48, as seen best in FIG. 4, which extends through a similarly shaped aperture in the center of brace 24, and which defines a central cavity 50 extending partially therethrough, the triangular design preventing rotational movement of the socket with respect to the spider arrangement. In addition, the socket includes a housing 52 extending above and sitting on brace 24. The housing is opened at its top end and defines a cylindrical cavity 54 which is provided for receiving a bearing 56, preferably made of a hard low-friction material such as plastic with polytetrafluoroethylene powder or other suitable carbon polymer added to give permanent lubrication.

The bearing 56 includes a lower, substantially spherical portion 58 which is forced snugly within cavity 54 of the socket for prohibiting lateral movement but which, due to the low friction material used, is free to swivel about any axis through its center. This swivel movement allows the bearing to continuously align itself with an upper bearing of the upper bearing assembly 22, in a manner to be described hereinafter.

Extending upward from the top of spherical portion 58 is a cylindrical sleeve portion 60 defining a cavity or channel 62 extending towards the center of the spherical portion and adapted to receive the lower end of shaft 16, so that the latter may freely rotate therein relative thereto. As seen in FIG. 2, only the pointed end of the shaft engages the bottom of the channel so that the thrust of the shaft is localized against a minute area of the bearing. This not only facilitates rotation of the shaft, but also, as will be discussed in more detail hereinafter, minimizes the frictional drag between the two in the thrust direction.

The upper bearing assembly 22 includes bearing cap arrangement 28, as stated above. This arrangement comprises a semispherical bearing cap or socket 64 opening downwardly, directly over the top of shaft 16, and having outwardly extending flange portions 66 and a plurality of horizontally extending legs circumferentially spaced around the cap. As seen in FIG. 1, the outer ends of legs 68 are connected by rivets or other suitable fastening means 69 to the upper ends of strut members 26 while their inner ends are connected in the same manner to flange portion 66, as indicated at 71. The cap 64 is preferably made of metal but may be made of a low friction material such as the material used for bearing 56.

In addition to the bearing cap arrangement 28, the upper bearing assembly 22 includes a bearing 70 which is identical to bearing 56 and which comprises an upper spherical portion 72 and a downwardly extending cylindrical sleeve portion 74. The sleeve portion defines a cavity or channel 76 which is provided for receiving the upper end of shaft 16, so that the latter may swivel freely therein in the same manner as described with respect to the lower end. Like the lower end of shaft 16, only the pointed end engages the bottom of cavity 76 for achieving the same advantages as described above. The spherical portion 72 fits within the bearing cap 64, as seen in FIG. 2, so that the bearing may swivel in the same manner as described with respect to bearing 56.

As stated hereinabove, one of the major deficiencies of the prior art ventilator units resides in the continuous disalignment of the bearings used therewith, which in turn increases frictional drag and reduces the efficiency thereof. This quite often occurs due to improper assemblage of the unit, or more than likely, due to the strong winds or other environmental elements which bear against and tend to deform the unit. However, with bearing assemblies 20 and 22, constructed in the aforementioned manner, this type of disalignment will not occur. Specifically, as one of the bearings, for example bearing 56, tends to move from its position, as shown in FIGS. 2, and other bearing 70 also will move, in response thereto, so as to compensate for the movement of bearing 56 and thereby remain in alignment therewith. If this were not the case, and only one of the bearing were to move from its initial aligned position, it is apparent that the shaft 16 would tend to bind within the bearings and increase the frictional drag thereof.

In addition, it has been found that the utilization of a flat ended shaft causes further binding, which is primarily due to the slippage between the flat surfaces of the shaft and the bearings. By providing the aforesaid pointed shaft, the engaging surfaces between the shaft and bearing are localized, which in turn substantially eliminates slippage, and therefore binding, in the direction transverse to the thrust of the shaft.

While a preferred embodiment of the present invention has been illustrated and described, it is obvious that many structural changes and modifications may be practiced without departing from the spirit and the scope of the invention as defined by the claims appended hereto.

The invention is claimed as follows:

1. A turbine ventilator unit comprising support means including upper and lower bearing assemblies, a longitudinal shaft having upper and lower pointed ends engaged against respective bearing assemblies for allowing said shaft to rotate freely about its longitudinal axis whereby the frictional drag between said shaft and said bearing assemblies is minimized, and a turbine head member connected to said shaft for rotary movement therewith, said upper bearing assembly including an upper bearing adapted to receive the upper pointed end of said shaft and said lower bearing assembly including a lower bearing aligned with said upper bearing and adapted to receive the lower pointed end of said shaft, said bearings being movable with respect to said support means for self alignment upon assembly with said shaft and for continuously remaining in alignment thereafter whereby frictional drag is further minimized.

2. A ventilator unit according to claim 1 wherein said upper and lower bearing assemblies further include respective upper and lower socket means connected to said support means and adapted to receive said upper and lower bearing respectively, said bearings being movable within said socket means, 3. A turbine ventilator according to claim 2 wherein each of said bearings includes a substantially spherical portion positioned within its respective socket means and mounted for swivel movement about any axis through its center relative to said socket means, and a sleeve portion for receiving a respective end of said shaft, said shaft being rotatable within and relative to said sleeve portion.

4. A turbine ventilator according to claim 3 wherein said bearings are made of a material having a low coefficient of friction whereby the friction between the bearings and the socket means and between the shaft and the bearings is minimized.

5. A turbine ventilator comprising support means including upper and lower bearing assemblies, a longitudinal rotatable shaft having its upper and lower ends axially engaged against respective bearing assemblies for allowing said shaft to rotate freely about its longitudinal axis, and a turbine head member connected to said shaft for rotary movement therewith, said upper bearing assembly including an upper bearing adapted to receive the upper end of said shaft and said lower bearing assembly including a lower bearing in alignment with said upper bearing and adapted to receive the lower end of said shaft, said bearing being movable with respect to said support means for self-alignment upon assembly with said shaft and for continuously remaining in alignment thereafter whereby the frictional drag between said shaft and said bearings is minimized.

6. A ventilator unit according to claim 5 wherein said upper and lower bearing assemblies further include respective upper and lower socket means connected to said support means and adapted to receive said upper and lower bearing, respectively, said bearings being movable within said socket means.

7. A turbine ventilator according to claim 6, wherein each of said bearings includes a substantially spherical portion positioned within its respective socket means and mounted for swivel movement about any axis through its center relative to said socket means, and a sleeve portion for receiving a respective end of said shaft, said shaft being rotatable within and relative to said sleeve portion.

8. A turbine ventilator according to claim 7 wherein said bearings are made of a material having a low coefficient of friction whereby the friction between the bearings and the socket means and between the shaft and the bearings is minimized.

* * * * *